Nov. 7, 1939.  A. J. KJOS  2,179,189
DRAFT POLE
Filed Jan. 12, 1939   2 Sheets-Sheet 2
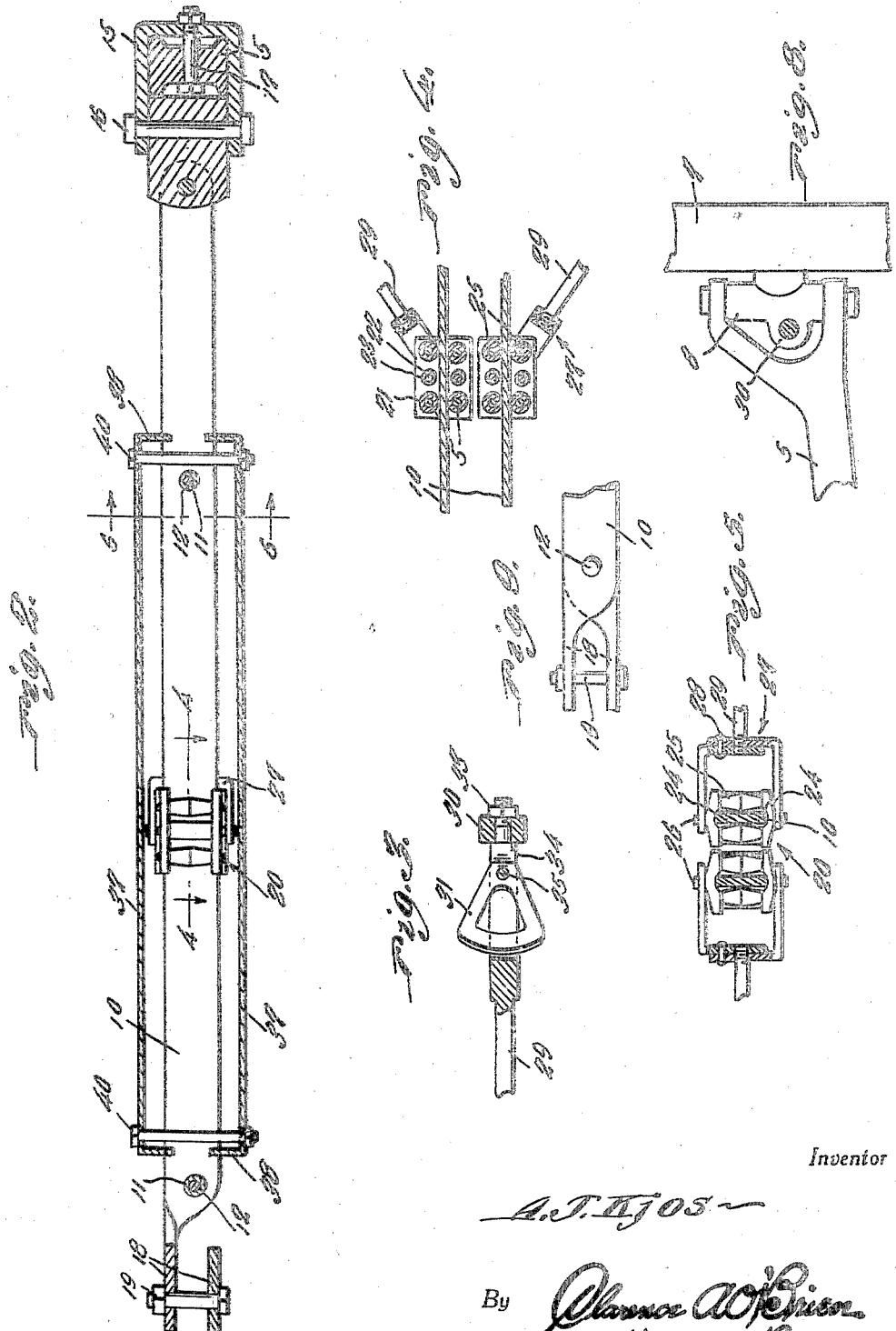
Inventor
A. J. Kjos
By Clarence A. O'Brien
and Hyman Berman
Attorneys Patented Nov. 7, 1939

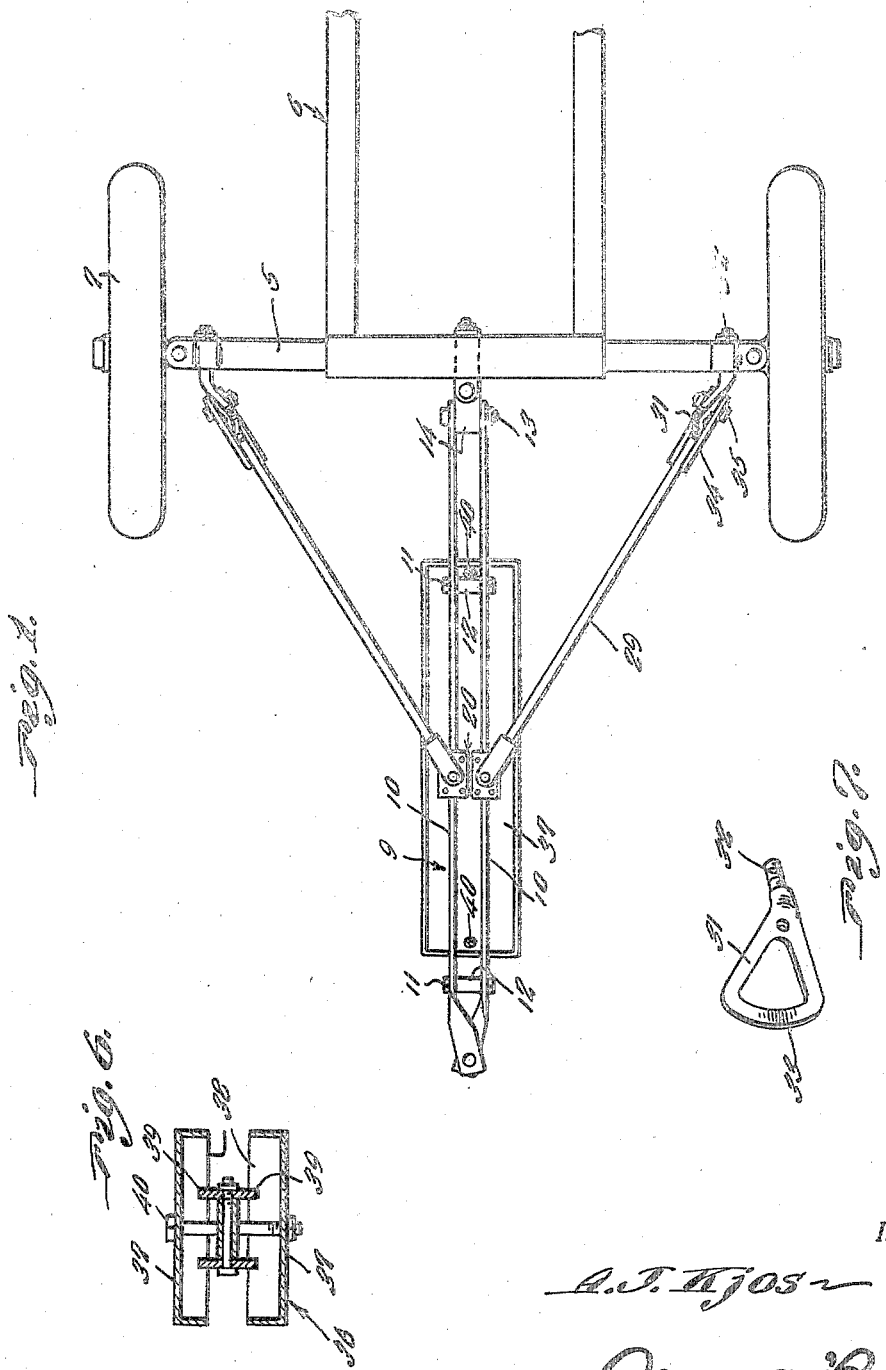

2,179,189

UNITED STATES PATENT OFFICE 2,179,189

DRAFT POLE

Alfred J. Kjos, Baker, Oreg.

Application January 12, 1939, Serial No. 250,613

4 Claims. (Cl. 280—33.55)

This invention relates to draft poles and an object of the invention is to provide a pole of this character for use primarily in connection with four-wheel trailers.

Further in accordance with the present invention the pole and associated parts are so constructed as to insure a pull straight from the center of the axle of the trailer whether a turn is being made to the right or left, the wheels of the trailer being truly guided during both forward travel and when negotiating a curve.

A further object of the invention is to provide a draft pole as will serve to eliminate "shimmy" of the front steering wheels of the trailer vehicle.

The invention together with its objects and advantages will be best understood from a study of the following description taken in connection with the accompanying drawings wherein:

Figure 1 is a top plan view illustrating the application of the draft pole with certain parts removed and other parts shown in section.

Figure 2 is a longitudinal sectional view through the draft pole.

Figure 3 is a detail view partly in section and partly in elevation showing the manner of connecting a guide bar to the steering knuckle of one of the front wheels of the trailer vehicle.

Figure 4 is a detail sectional view taken substantially on the line 4—4 of Figure 2.

Figure 5 is a detail view showing a pair of block assemblies, with certain parts shown in section.

Figure 6 is a detail sectional view taken substantially on the line 6—6 of Figure 2.

Figure 7 is a perspective view of a stub-guide, and

Figure 8 is a fragmentary detail view showing the steering knuckle of a front wheel assembly prepared for the attachment thereto of a stub-guide.

Figure 9 is a fragmentary side elevational view of the parallel coextensive draft pole-bars at the free end of the draft pole.

Referring more in detail to the drawings it will be seen that 5 indicates generally the front axle of a four-wheel trailer only a portion of which is shown and is indicated generally by the reference numeral 6. The front wheels of the trailer 6 are indicated by the reference numeral 7 while the steering knuckles for the front wheels are indicated generally by the reference numeral 8.

In the preferred embodiment thereof the improved draft pole is indicated generally by the reference numeral 9 and comprises a pair of spaced parallel coextensive bars 10—10 that are secured together through the medium of bolts 11 and are held in spaced relation through the medium of sleeves 12 on the bolts 11.

At one end thereof the bars 10 of the pole are pivoted as at 13 to a hitch block 14 that in turn is connected to a U-shaped clamp 15 through the medium of a vertical pivot bolt 16. Thus it will be seen that the pole 10 is free to swing vertically on the pivot 13 and laterally either to the right or left on the pivot 16.

In attaching the pole to the center of the front axle 5 of the trailer 6 the clamp 15 embraces the axle as clearly shown in Figure 2 and is secured in position on the axle through the medium of a nut-equipped bolt 17, the axle 5 being provided with an opening therethrough to accommodate the bolt as shown in Figure 2.

At the free forward ends thereof the bars 10 of the pole are longitudinally twisted as at 18 to provide upper and lower parallel extensions that are apertured to accommodate a bolt 19 through the medium of which any conventional coupling may be pivoted to said ends 18 of the draft pole bars 10 for connecting the draft pole to the lead or draft vehicle.

Slidably associated with each bar 10 of the draft pole is a slide or block assembly 20.

Each block assembly 20 as best shown in Figures 4 and 5, comprises a pair of upper and lower plates 21—21 secured together through the medium of bolts 22 and held in spaced relation through the medium of sleeves 23 on the bolts 22.

The confronting faces of the plates 21 are provided with longitudinal grooves 24 to accommodate the longitudinal edges of the bars 10 as clearly shown in Figure 5.

Also, journaled between the plates 21 adjacent the front and rear ends of the plates are pairs of slightly spaced rollers 25 between which the bars 10 are accommodated.

Each block assembly has pivoted to the upper and lower plates thereof as at 26 the legs of a yoke 27.

As shown in Figure 5, the yoke 27 is composed of a pair of substantially L-shaped members which at the closed end of the yoke are riveted or otherwise secured together as at 28 and are provided with aligned, threaded apertures for the threaded reception of a wheel guide rod 29.

Thus it will be seen that the block assemblies or slides 20 are free to ride on the pole bars 10 in either direction and incidental to a swinging movement of the pole towards the right or left.

Further in accordance with the present invention the knuckles 8 of the front wheels 7 of the trailer vehicle are provided with apertured lugs 30 to receive the shanks of stub-guides 31. The shanks 32 of the stub-guides 31 are equipped with nuts 33 and shoulders 34 in a manner to secure the shanks of the stub-guides to the lugs 30 of the steering knuckles 8.

As shown in Figure 7 the stub guides 30 have the main body portions thereof in the form of a substantially triangular-shaped frame with one side thereof substantially co-planar with the shanks 32, and the main body part offset at an angle to the axial center of the shanks 32. Further each stub-guide 31 has the main body portion thereof slightly curved or dished as indicated generally at 33.

Each wheel guide rod is provided at one end thereof with a pair of spaced parallel coextensive extensions 34 that receive therebetween the body of a stub guide 31 and which are pivoted to the stub guide through the medium of a pivot bolt 35. Thus it will be seen that as the draft pole swings to the right or to the left the wheels 7 of the trailer vehicle will be caused to turn in a corresponding direction, this being accomplished without any stress or strain being placed on the wheel guide rods 29. Further, the guide rods 29 being pivoted as at 35 to the stub guides 31, the wheel guides 29 will be relieved of strain and stress incidental to a swinging movement of the draft tongue 9 in a vertical plane.

Further in accordance with the present invention there is provided for the slides or blocks 20 an elongated casing indicated generally by the reference numeral 36.

The casing 36 comprises a pair of top and bottom elongated rimmed sections 37, the rims 38 of which at the ends of said sections are notched as at 39 to accommodate the pole bars 10.

The sections 37 of the housing 36 are secured in fixed position on the bars 10 of the pole 9 through the medium of bolts 40. Thus it will be seen that the sliding blocks 20 operate on the bars 10 within the confines of the housing 36 and are materially protected by said housing from the elements.

By providing the stub guides 31 the front wheels of the trailer vehicle will be positively held against "shimmying" since such wheels are held in position by said stub guides, which latter cannot move unless the draft pole moves directionally itself. Also in this connection it is to be noted that the front wheels of the trailer vehicle act independently, each having a steering mechanism separate and distinct from the other.

It is thought that a clear understanding of the construction, utility and advantages of a draft pole embodying the features of the present invention will be had without a more detailed description thereof.

Having thus described the invention what is claimed as new is:

1. A draft pole provided at one end thereof for the hitching of the pole to the front axle of a trailer vehicle, and at an opposite end thereof for hitching said pole to a draft vehicle, independently movable slides on the draft pole, trailer wheel-guide rods pivotally connected at one end thereof to said slides, and means for pivotally connecting the free ends of said wheel-guide rods to the steering knuckles of the front steering wheels of a trailer vehicle, said draft pole embodying a pair of spaced parallel coextensive bars, and said slide elements respectively embodying a pair of upper and lower plates and pairs of laterally spaced rollers journaled between said plates and accommodating said bars therebetween.

2. In a draft pole assembly, a draft pole comprising a pair of spaced parallel coextensive bars provided at one end for the hitching thereof to the axle of a draft vehicle and to swing relative thereto in vertical and horizontal planes, and at an opposite end thereof for the hitching of the pole to a draft vehicle, slide blocks mounted on said bars, trailer wheel-guide rods pivoted at one end thereof to said slide blocks and provided at a free end thereof for positive connection with the steering knuckle of the front whels of a trailer vehicle and a housing for said slide blocks mounted on said pole, said housing including a pair of upper and lower complemental rimmed plates, said plates having notches in the rims thereof at the ends of the plates to accommodate the bars of said pole, and bolt means securing the plates of the housing together and in fixed position on said pole.

3. A draft pole for a vehicle provided with spindle carrying steering knuckles at the ends of its front axle, said knuckles being independent of each other, said pole having means at one end thereof for connection to the front axle of the vehicle and said pole having longitudinally extending guides, independently movable slides engaging the guides, rods pivotally connected at one end to said slides and means for pivotally connecting the other ends of said rods to the knuckles.

4. A draft pole for a vehicle provided with spindle carrying steering knuckles at the ends of its front axle, said knuckles being independent of each other, said pole having means at one end thereof for connection to the front axle of the vehicle and said pole having longitudinally extending guides, independently movable slides engaging the guides, rods pivotally connected at one end to said slides and means for pivotally connecting the other ends of said rods to the knuckles, the latter means including a forked end for each rod and a forwardly extending member connected with each knuckle and having a part fitting between the prongs of the fork and a pivot passing through the outer ends of the prongs and to an intermediate part of the member, that part of the member between the pivot and its front end being enlarged in a vertical plane and dished to engage the inner edges of the prongs.

ALFRED J. KJOS.